United States Patent
Bannon et al.

(10) Patent No.: US 12,307,350 B2
(45) Date of Patent: May 20, 2025

(54) SYSTEMS AND METHODS FOR HARDWARE-BASED POOLING

(71) Applicant: Tesla, Inc., Palo Alto, CA (US)

(72) Inventors: Peter Joseph Bannon, Woodside, CA (US); Kevin Altair Hurd, Redwood City, CA (US)

(73) Assignee: Tesla, Inc., Austin, TX (US)

( * ) Notice: Subject to any disclaimer, the term of this patent is extended or adjusted under 35 U.S.C. 154(b) by 1227 days.

(21) Appl. No.: 15/862,369

(22) Filed: Jan. 4, 2018

(65) Prior Publication Data

US 2019/0205738 A1    Jul. 4, 2019

(51) Int. Cl.
| | |
|---|---|
| *G06N 3/063* | (2023.01) |
| *G06F 18/24* | (2023.01) |
| *G06N 20/00* | (2019.01) |
| *G06V 10/82* | (2022.01) |
| *G06V 30/19* | (2022.01) |

(52) U.S. Cl.
CPC ............ *G06N 3/063* (2013.01); *G06F 18/24* (2023.01); *G06N 20/00* (2019.01); *G06V 10/82* (2022.01); *G06V 30/19173* (2022.01)

(58) Field of Classification Search
CPC ...... G06N 20/00; G06N 3/063; G06N 3/0464; G06N 3/048; G06V 10/454; G06V 10/82; G06F 18/24

See application file for complete search history.

(56) References Cited

U.S. PATENT DOCUMENTS

| | | |
|---|---|---|
| 6,882,755 B2 | 5/2005 | Silverstein et al. |
| 7,209,031 B2 | 4/2007 | Nakai et al. |
| 7,747,070 B2 | 6/2010 | Puri |
| 7,904,867 B2 | 3/2011 | Burch et al. |

(Continued)

FOREIGN PATENT DOCUMENTS

| | | |
|---|---|---|
| AU | 2019261735 A1 | 6/2020 |
| AU | 2019201716 A1 | 10/2020 |

(Continued)

OTHER PUBLICATIONS

International Search Report and Written Opinion of the International Searching Authority dated Mar. 25, 2019, in International Patent Application No. PCT/US18/065290, filed Dec. 12, 2018 (7 pgs).

(Continued)

*Primary Examiner* — Abdullah Al Kawsar
*Assistant Examiner* — Tewodros E Mengistu
(74) *Attorney, Agent, or Firm* — Knobbe, Martens, Olson & Bear, LLP

(57) ABSTRACT

Described herein are systems and methods that utilize a novel hardware-based pooling architecture to process the output of a convolution engine representing an output channel of a convolution layer in a convolutional neural network (CNN). The pooling system converts the output into a set of arrays and aligns them according to a pooling operation to generate a pooling result. In certain embodiments, this is accomplished by using an aligner that aligns, e.g., over a number of arithmetic cycles, an array of data in the output into rows and shifts the rows relative to each other. A pooler applies a pooling operation to a combination of a subset of data from each row to generate the pooling result.

18 Claims, 5 Drawing Sheets

(56) References Cited

U.S. PATENT DOCUMENTS

| | | |
|---|---|---|
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugal et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhal et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,349 B2 | 6/2020 | Bannon et al. |
| 10,671,886 B2 | 6/2020 | Price et al. |
| 10,678,244 B2 | 6/2020 | Landola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |

(56) References Cited

U.S. PATENT DOCUMENTS

| | | | |
|---|---|---|---|
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa et al. |
| 2012/0110491 A1 | 5/2012 | Cheung |
| 2012/0134595 A1 | 5/2012 | Fonseca et al. |
| 2015/0104102 A1 | 4/2015 | Carreira et al. |
| 2015/0178246 A1 | 6/2015 | Herrero |
| 2015/0347831 A1* | 12/2015 | Tamatsu ................ H04N 5/144 348/148 |
| 2016/0132786 A1 | 5/2016 | Balan et al. |
| 2016/0328856 A1 | 11/2016 | Mannino et al. |
| 2016/0335120 A1* | 11/2016 | Gupta .................. G06F 9/5044 |
| 2016/0342888 A1* | 11/2016 | Yang .................. G06V 10/454 |
| 2016/0342889 A1* | 11/2016 | Thorson .................. G06N 5/04 |
| 2016/0342893 A1* | 11/2016 | Ross .................... G06F 17/153 |
| 2017/0011281 A1 | 1/2017 | Dihkman et al. |
| 2017/0103298 A1 | 4/2017 | Ling et al. |
| 2017/0103304 A1* | 4/2017 | Henry ...................... G06N 3/04 |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0101748 A1* | 4/2018 | Yang ....................... G06F 18/24 |
| 2018/0121762 A1 | 5/2018 | Han et al. |
| 2018/0150081 A1 | 5/2018 | Gross et al. |
| 2018/0189238 A1* | 7/2018 | Lau ........................ G06V 10/82 |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095776 A1* | 3/2019 | Kfir ...................... G06F 12/0207 |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bal et al. |
| 2019/0147255 A1 | 5/2019 | Homayounfar et al. |
| 2019/0147335 A1 | 5/2019 | Wang et al. |

(56) References Cited

U.S. PATENT DOCUMENTS

| | | |
|---|---|---|
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |

(56) References Cited

U.S. PATENT DOCUMENTS

| | | |
|---|---|---|
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 105184309 | 12/2015 |
| CN | 103236037 B | 5/2016 |
| CN | 103500322 B | 8/2016 |
| CN | 106419893 A | 2/2017 |
| CN | 106504253 A | 3/2017 |
| CN | 106611169 | 5/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |

(56) References Cited

FOREIGN PATENT DOCUMENTS

| | | |
|---|---|---|
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2557703 | 6/2018 |
| GB | 2560600 | 9/2018 |
| GB | 2577485 A | 4/2020 |
| GB | 2517270 B | 6/2020 |
| JP | 2578262 Y2 | 8/1998 |
| JP | 3941252 B2 | 7/2007 |

(56) References Cited

FOREIGN PATENT DOCUMENTS

| | | |
|---|---|---|
| JP | 2009-015637 | 1/2009 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

OTHER PUBLICATIONS

Yang et al., 2012, Cloud computing promotes the leap-forward development of archives informatization, China Archives, 2013(01):69-71.

Zhao et al., Aug. 2018, Design of the programmable neural network processor based on the transport triggered architecture, Journal of Xidian University, 45(4): 92-98.

* cited by examiner

SYSTEMS AND METHODS FOR HARDWARE-BASED POOLING

A. TECHNICAL FIELD

The present disclosure relates generally to systems and methods for improving utilization of computing resources, such as computational power and storage requirements. More particularly, the present disclosure is related to systems and methods for improving efficiency of arithmetic processes in computer vision applications that use convolutional neural network (CNN) architectures to generate convolutional and pooling data.

B. BACKGROUND

Neural network-based image classifiers are achieving significant improvements in automatically learning complex features for classification and object recognition. For example, a Convolutional Neural Network (CNN) model may be used to automatically determine whether an image can be categorized as comprising a person or animal. The CNN applies a number of hierarchical network layers and sub-layers to an input image when making a determination or prediction. One characteristic of CNNs is that each network layer serves as an output of a previous layer, typically starting at a first convolutional layer and ending with one or more final layers, e.g., a fully connected layer that includes nodes whose activation values deliver scores that indicate a likelihood that the input image can indeed be classified as comprising a certain object.

A convolution layer may use several filters known as kernels or activation functions that apply to the pixels of a convolution window of an image a set of weights. The weights have been learned by the CNN during a training phase to generate an activation value associated with that window. For each filter, the convolution layer may have, for each pixel, one node, i.e., neuron, that outputs an activation value that is calculated based on the set of weights. The activation value for the convolution window identifies a feature or characteristic, such as an edge that can be used to identify the feature at other locations within the image. Since all nodes for a filter can share the same set of weights, reusing weights is a common technique to increase utilization of both storage space and computation time.

Among the most important types of layers of a CNN is the pooling layer—a basic, independent building block that is typically placed after a convolutional layer. As applied to images, a pooling layer allows the network to determine a feature map and learn a set of features for the image. Pooling is viewed as a form of nonlinear sub-sampling or down-sampling that uses a nonlinear function, such as max-pooling or average-pooling, to reduce the number of neurons when progressing from layer to layer through the network; thereby, reducing the amount of computation and further increasing computational performance.

Pooling generally involves sliding a pooling window, e.g., a two-dimensional square of multiple pixels in width and multiple pixels in height, stepwise across small, non-overlapping areas (i.e., receptive field) of the output of a preceding convolution layer. Aggregating the values of the group of neurons in that area provides single output values (e.g., integers) for each group in a local neighborhood. These output values assigned to each group are passed to a subsequent layer without performing a convolution and depend on the type of pooling function (e.g., average or max) that is used in the pooled area. The size and location of the pooling window depends on the pooling stride (i.e., interval or step size) and the location of the output pixel. Oftentimes, the last pooling layer is followed by the final output layer (e.g., a fully connected layer with a soft-max nonlinearity) of the CNN architecture that outputs the final prediction, e.g., as an estimate of a conditional probability, for each particular class.

While great progress has been achieved in improving the performance of convolutional layers by sharing of weights and improving arithmetic logic unit utilization, pooling layers, which are similarly computationally intensive, have been neglected mainly due to constraints inherent to existing neural network architectures.

Accordingly, it would be desirable to have systems and methods that improve the performance of pooling layers in neural networks to further increase the utilization end performance of available computational resources to reduce overall computational cost.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
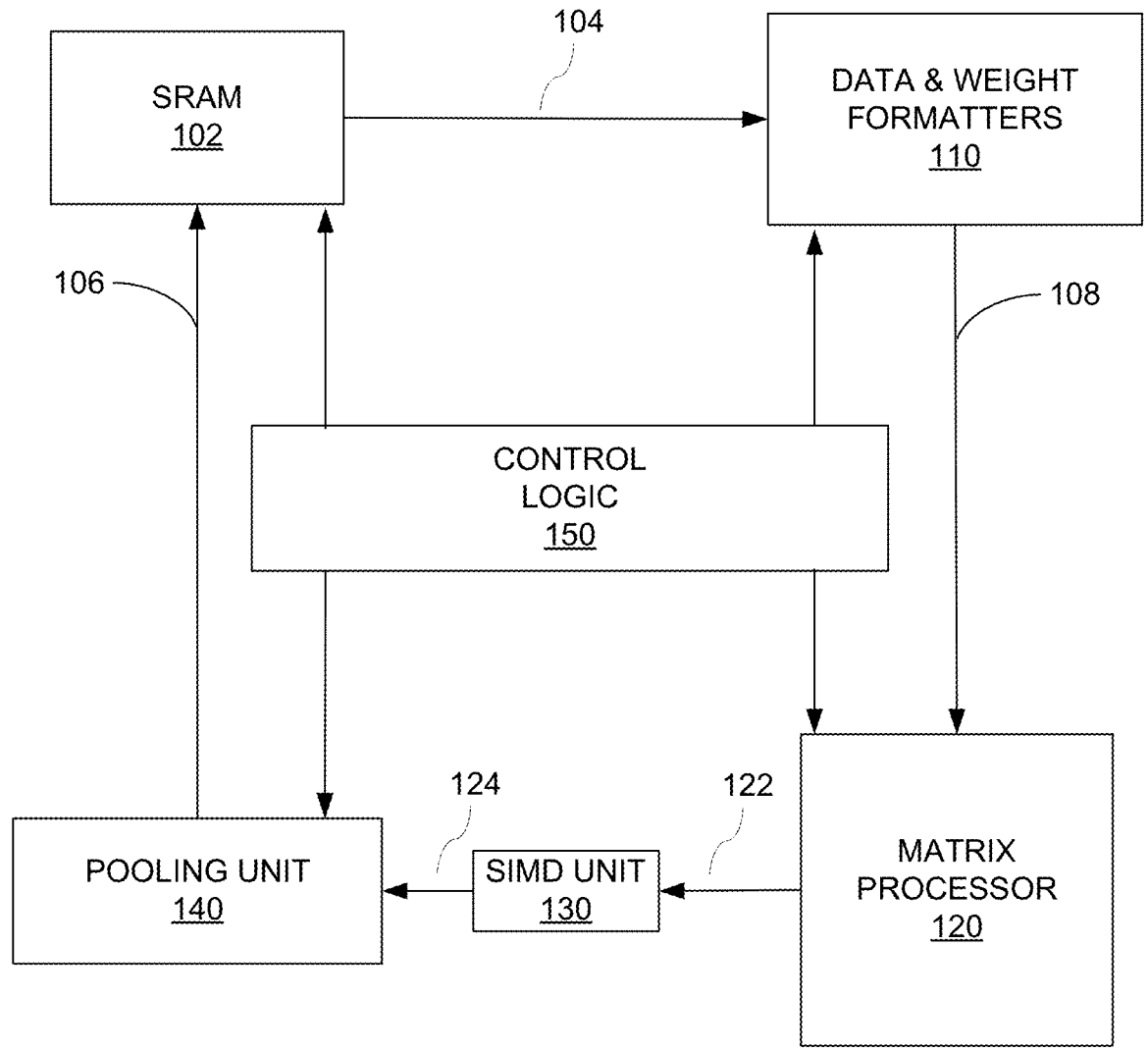
FIG. 1 is an exemplary block diagram of a system that uses a pooling unit for performing pooling operations according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

FIG. 1 is an exemplary block diagram of a system that uses a pooling unit for performing pooling operations according to various embodiments of the present disclosure. System 100 comprises SRAM 102, data/weight formatter 110, matrix processor 120, post-processing unit 130, pooling unit 140, control logic 150. It is understood that system 100 may comprise additional circuits and sub-circuits, such as logic circuitry and/or control circuitry, caches, local buffers, comparators, state machines, additional post processing units, and auxiliary devices that perform management functions.

In embodiments, any component in system 100 may be partially or entirely controlled by control logic 150 that may monitor the status and operations of system 100, e.g., when performing an operation such as a convolution or other mathematical calculation, and calculate locations from which to retrieve data that will be used in a subsequent step of the operation. Similarly, control logic 150 may manage other components, e.g., components that are not shown in FIG. 1 and/or outside of system 100.

In embodiments, SRAM 102 stores and makes accessible input image data, e.g., in a data input matrix and a weight input matrix 104. One skilled in the art will recognize that other types of storage devices may be used.

In embodiments, based on the weight input matrix and data input matrix 104, data/weight formatter 110 produces two outputs 108, e.g., each 96-columns wide, for matrix processor 120, which may process a very large number of elements of a matrix in parallel to efficiently map data into a matrix operation. Data/weight formatter 110 may be implemented as any number of in-line formatters that convert, e.g., data input matrices and weight input matrices 104 into a suitable format for further processing by matrix processor 120, e.g., according to specific hardware requirements of matrix processor 120. In embodiments, formatter 110 converts two-dimensional or three-dimensional matrices into a single vector or string that may be represented by a row or column before making the so linearized or vectorized data available as input 108 to matrix processor 120. As a result, matrix processor 120 can be efficiently utilized to execute a matrix multiply operation as part of a convolution computation in system 100 to generate output array 122 that then may be reassembled, e.g., into an image.

A neural network model using the embodiments of the present disclosure may comprise a pooling network that uses max-pooling layers, averaging pooling layers, and other neural network layers. The pooling network may be followed or preceded by, e.g., (by a processing module that uses a fully-connected layer and), in embodiments, an activation layer that uses a known function, such as a non-linear function, e.g., a Rectified Linear Unit (ReLU), logistic sigmoid function, and the like.

In embodiments, matrix processor 120 performs a convolution operation by applying individual filters (e.g., weights) to input image data to detect small features within an input image. By analyzing a sequence of different features in a different order, macro features may so be identified in the input image. Matrix processor 120 may use a different set of weights for each input channel, as each input channel may contain a different set of information, and each weight matrix may be used detect a different feature. In embodiments, matrix processor 120 multiplies a rectangular input matrix with a rectangular weight matrix to obtain partial dot products that may then be summed to generate an accumulated dot product, i.e., an integer, which represents an output pixel in an output image. In embodiments, output array 122 may correspond to the dot product of two matrices 108 that have been processed by formatter 110.

In embodiments, matrix processor 120 may perform convolution operations that convolve an input with a filter to generate output 122 by converting a convolution operation into a matrix multiplication (e.g., a 96×96 matrix multiplication). Matrix processor 120 may comprise circuitry, such as arithmetic logic units, registers, encoders and may be implemented as having an arbitrary number of columns and rows to perform mathematical accelerated operations across a large set of data and weights. These large-scale operations may be timed according to the specific hardware requirements of matrix processor 120 to accelerate convolution operations, e.g., by reducing redundant operations within system 100 and by implementing hardware specific logic.

In embodiments, matrix processor 120 outputs 122 a linearized vector or array representing an output channel that may be stored in storage within post-processing unit 130. In embodiments, pooling unit 140 operates on a single output channel of matrix processor 120, such that output 122 or post-processed output 124 is an array that may otherwise not conveniently map into a matrix operation. Therefore, in embodiments, output array 122 may be reformatted into a suitable format for pooling unit 140 to increase the efficiency of system 100.

In contrast, conventional implementations that employ a vector engine that performs vector operations on a stored convolution would lead to rather complex and inefficient pooling operations the output of a highly efficiency matrix processor, such as matrix processor 120, in part, because some values in output array 122 may be adjacent while others may not. In short, a pooling algorithm following a convolution operation by matrix processor 120 would have to process a combination of values in output array 122 that are not presented in a convenient shape or format for common pooling methods. Therefore, in embodiments, output array 122 is reformatted in order to allow for the application of improved pooling methods to a high-efficiency matrix processor 120.

To achieve this, in embodiments, hardware pooling unit 140, in response to receiving output array 122, e.g., as processed by post-processing unit 130, reformats the received data into a grid format, such that some elements of output array 122 may be aligned in a vertical direction and others may be aligned in a horizontal direction, such that pooling can be directly applied without the need to perform cumbersome, computational-intensive intermediate steps and data storage operations. In embodiments, formatter 110 may reformat different shapes of input matrix data into columns and rows suitable for matrix processor 120. In embodiments, formatting may be performed dynamically to accommodate processing of matrices that have differing input sizes.

In embodiments, pooling unit 140 applies a pooling function, e.g., average pooling and max pooling, to the reformatted data in order to generate and output pooled data 106 that may then be written and stored in SRAM 102, e.g., as a feature map. The internal operation of pooling unit 140 will be described in more detail with respect to FIG. 2.

In embodiments, matrix processor 120 outputs a set of convolution data, e.g., output array 122, while accumulating and computing the next set of convolution data. Similarly, pooling unit 140 generates output 106 on-the-fly from data shifted out of matrix processor 120, thus, covering the cost of pooling and reducing computation time when compared to software-based pooling methods, which require that a convolution be stored in intermediate storage prior to being passed through a pooling layer.

In embodiments, post-processing unit 130 receives data, e.g., a dot product result that corresponds to an output channel, from the bottom row of matrix processor 120, e.g., via output flip-flops (not shown) that form a shift register. Post-processing unit 130 may apply, e.g., a non-linear ReLU function to output array 122.

It is noted that padding, e.g., zero-padding, may be performed at the edges of a matrix prior to a convolution layer operation in order to obtain a predetermined output feature map size. In embodiments, padding may be enabled if the stride is set to a value greater than 1. If padding is enabled, control logic 150 may treat certain columns as zeros, such that the divisor in an average pooling operation is adjusted to equal the sum of the non-zero pooling values involved in the average calculation.

Figure 2:
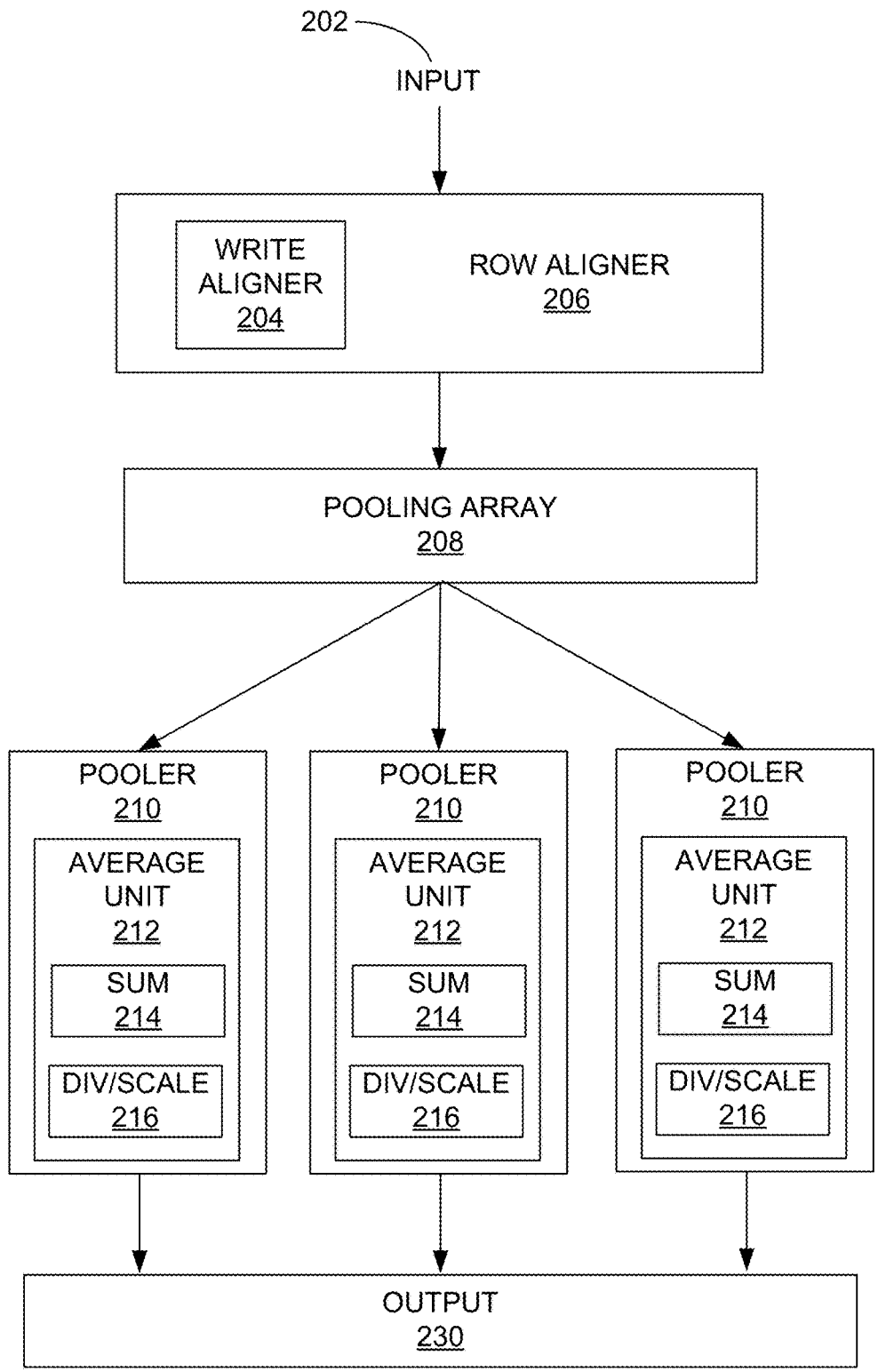
FIG. 2 is an exemplary block diagram of a pooling unit architecture according to various embodiments of the present disclosure.

FIG. 2 is an exemplary block diagram of a pooling unit architecture according to various embodiments of the present disclosure. Pooling unit 200 may comprise row aligner 206, write aligner 204, pooling array 208, pooler 210. In embodiments, pooler 210 may comprise a max unit (not shown), averaging unit 212, or any other unit that may perform pooling operations to generate output 230. In embodiments, averaging unit 212 performs and averaging function by using summing element 214 followed by divide and or scale unit 216.

Input 202 may correspond to a set of feature maps. In embodiments, input 202 constitutes an output channel that has been produced according to the requirements of a high-efficiency matrix processor, for example, a matrix processor disclosed U.S. patent application Ser. No. 15/710, 433 entitled "Accelerated Mathematical Engine," which reference is incorporated herein in its entirety.

In embodiments, pooling unit 200, in response to receiving input 202, reformats the data therein into the equivalent of a grid pattern to which conventional pooling methods may be applied, for example, to reduce the height and width of the feature maps by a factor of two. In embodiments, pooling unit 200 accomplishes reformatting by arranging and storing input 202 (e.g., in row aligner 206) in a number of rows that have the same width as input 202, such that each row comprises sections of data that correspond to a group of neighborhood values in a matrix to which a pooling operation may be applied to obtain a pooling result. In embodiments, once the rows are aligned such that those sections that belong to the same neighborhood can be extracted, pooling may be easily performed, e.g., by pooler 210. In embodiments, the combination of sections pooled in this manner represents a pooling result of an entire pooled output channel of a convolution.

In embodiments, row aligner 206 stores input 202 in such a way that it can be accessed and read by pooler 210 as to-be-pooled data. In other words, the output channel of the matrix processor may be reformatted to a format that can be read easily pooled by pooler 210 while maintaining a stream of input data 102. In embodiments, row aligner 206 is controlled by a controller (not shown) to shift incoming input 202 prior to writing the result into a number of pooling arrays 208, e.g., 3 arrays that comprise the to-be-pooled data.

In embodiments, pooler 210 identifies suitable values in row aligner 206 for use in a particular pooling calculation and extracts from pooling arrays 208 a number of values to compute a pooling result. The pooling result depends on the type of pooling function used and may be an average value, a maximum value, or an intermediate value (e.g., a sum) that may be converted into a suitable pooling result. In embodiments, divide and or scale unit 216 may follow averaging unit 212 and may be implemented as a multiply-and-shift circuit that generates output 230. In embodiments, pooler 210 may access pooling array 208 to process any subsection of pooling array 208 that comprises a number of to-be-pooled values. For example, e.g., pooler 210 may pool 9 values corresponding to a 3×3 pooling window to generate an average pooling value. It is understood that the pooling window may assume any arbitrary size and shape depending on parameters settings.

In embodiments, input 202 is read, and reformatting is applied over a period of n arithmetic cycles, e.g., using a method for aligning rows of data (further discussed with respect to FIG. 4) to generate pooling results 230 in every cycle, e.g., one row at a time. In embodiments, once an output channel is read, e.g., as input 202, the next output channel may be read and reformatting may be applied, for example, by using a different set of memory that stores the rows of data in a different pooler 212, until all output channels provided by the matrix processor are processed and the results 230 can be output. It is understood that portions of an output channel and, in general, different output channels may be processed at different times using other methods and other circuit configurations than those depicted in FIG. 2 and accompanying text. As those skilled in the art will appreciate, additional pooling layers may be used to output higher level or refined feature maps.

In embodiments, pooling unit 200 computes pooling results as fast as matrix processor 120 to generate output 122. Pooling unit 140 may apply a stride of, e.g., n=2 or n=3, to control the amount of elements the sliding window crosses between calculations. A person of skill in the art will appreciate that the sliding mechanism for pooling layers operates in a similar manner as that in a convolution layer that, for example, uses a common kernel size of 2 or 3, with the difference that the average or the largest value is selected in the pooling window.

In embodiments, pooling unit 200 receives the processed data and performs a computation on a set of arrays that may be spatially shifted relative to each other. In embodiments, pooling result 124 is pulled or shifted by a state machine (not shown) into an output array, e.g., one per clock cycle. The state machine may perform additional operations on pooling result 124 prior to sending data to SRAM 102 or some other post-processing unit (not shown).

It is understood that pooling unit 200 may further comprise components and sub-circuit circuits not shown in FIG. 2, such as a control unit that coordinates the sequence of operations of any number of components coupled with pooling unit 200. For example, the control unit may determine the number and location of data points that are involved in a given operation without modifying the sequence of the operation itself.

Figure 3:
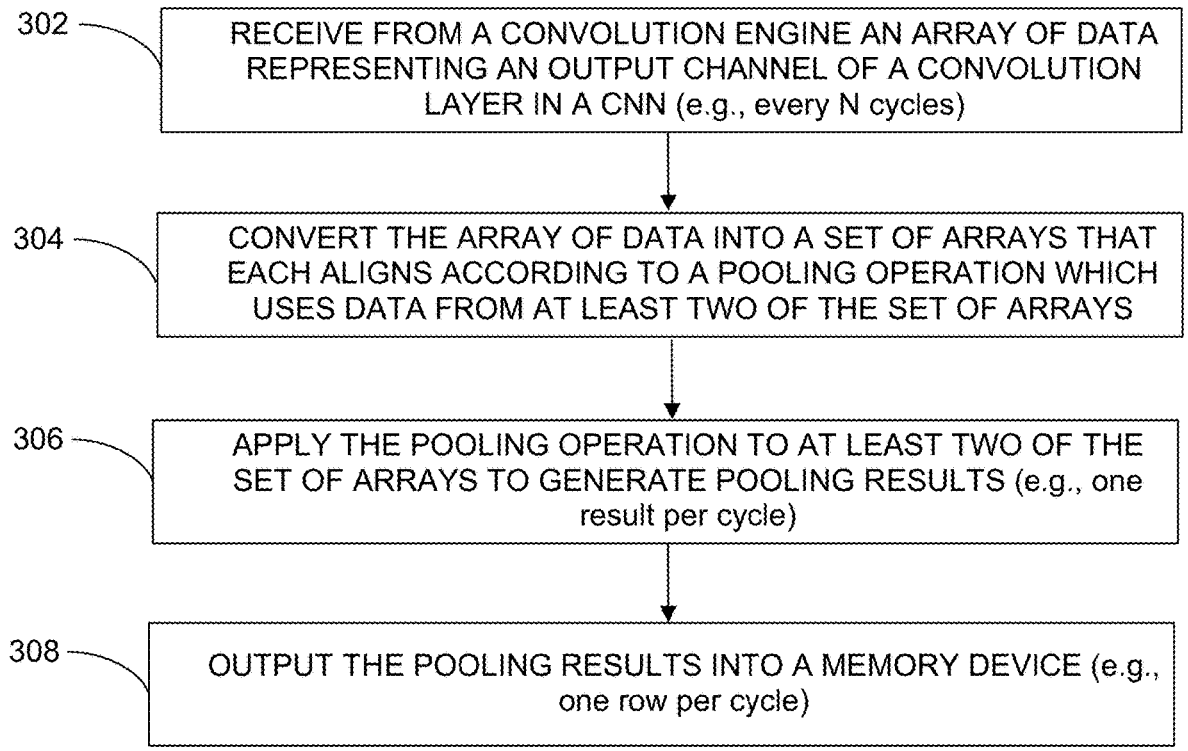
FIG. 3 is a flowchart of an illustrative process for using a pooling system shown in FIG. 1.

FIG. 3 is a flowchart of an illustrative process for using a pooling system shown in FIG. 1. Process 300 begins step 302 when data from a convolution engine is received, e.g., at a pooling unit and at every n cycles. In embodiments, the data is received in the form of a data array and represents an output channel of a convolution layer in a CNN.

At step 304, the array is converted into a set of arrays that are aligned according to a pooling operation. In embodiments, the pooling operation uses at least two arrays from the set of arrays to apply a pooling operation, at step 306, to generate pooling results, e.g., one result per cycle.

Finally, at step 308, the pooling result is output, e.g., as one row per arithmetic cycle, into a memory device.

Figure 4:
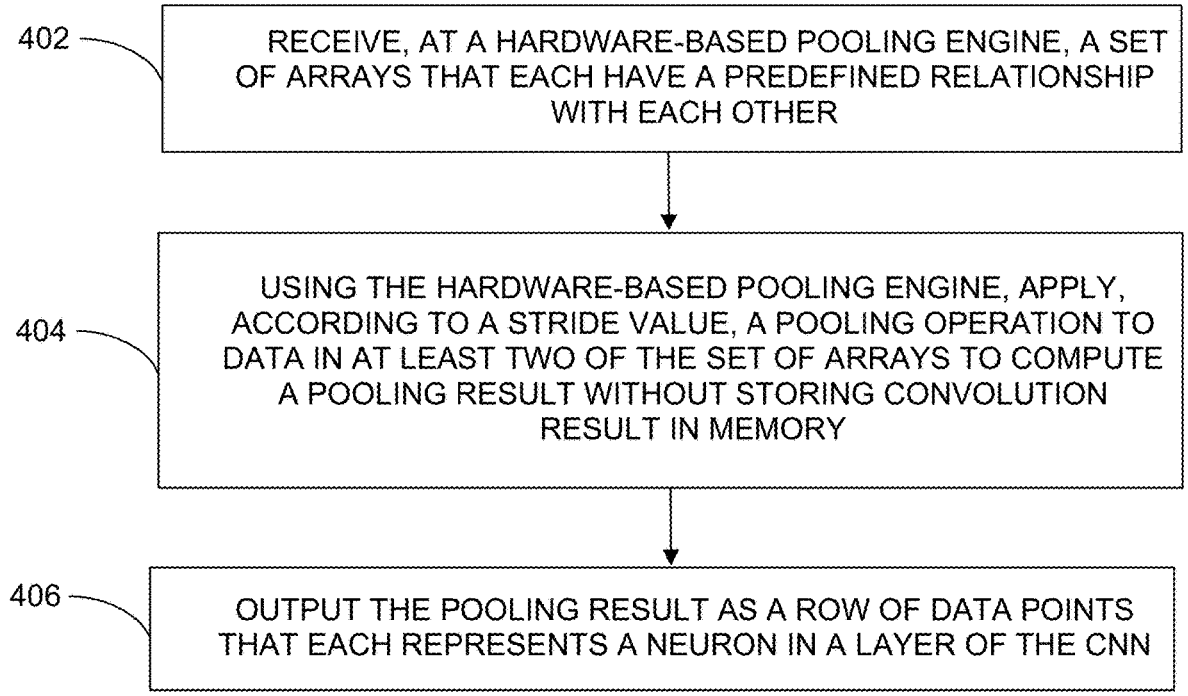
FIG. 4 is a flowchart of an illustrative process for using the pooling unit architecture shown in FIG. 2.

FIG. 4 is a flowchart of an illustrative process for using the pooling unit architecture shown in FIG. 2. Process 400 begins step 402 when a hardware-based pooling unit receives from a convolution engine a set of data arrays that each have a predefined relationship with each other.

At step 404, using the hardware-based pooling unit, a pooling operation is applied to data in at least two arrays from the set of data arrays to obtain a pooling result, e.g., an average or max pooling result. The pooling operation may be applied according to a stride value. In addition, this hardware-based pooling method takes advantage of a 1:1 output channel to input channel relationship that, advantageously eliminates the need to write a convolution result into intermediate memory.

At step 406, the pooling result is output, e.g., as one row of data points per cycle that each represent a neuron in a layer of the CNN.

Figure 5:
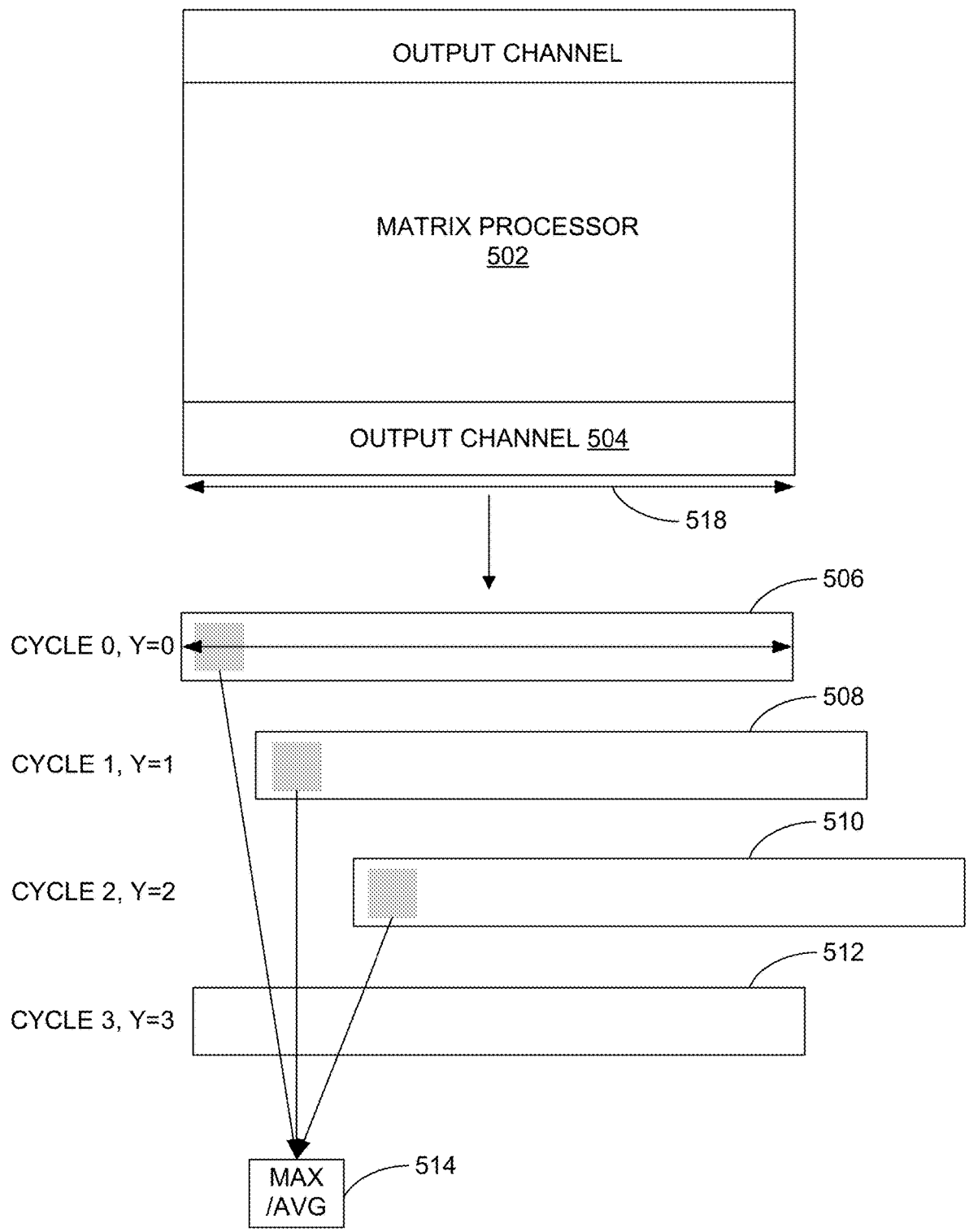
FIG. 5 is a flowchart of an illustrative process for performing pooling operations according to various embodiments of the present disclosure.

FIG. 5 is an exemplary block diagram illustrating a process for performing pooling using the pooling unit architecture shown in FIG. 2. In embodiments, the matrix processor 502 of the pooling unit architecture outputs output channel 504. Since a pooling operation may be treated as a convolution with fixed weights a matrix processor could be used to perform the pooling operation. However, since there is typically only a single output channel in pooling, operating only one output channel of multi-output channel matrix processor at a time is a rather inefficient undertaking that unnecessarily ties up computing resources. Therefore, to increase computing efficiency, in embodiments, output channel 504 may be written into a number of rows 506-510 that are aligned, e.g., by a row aligner as shown in FIG. 2, such that each row 506-510 is shifted against another in subsequent cycles. In embodiments, rows Y=0, Y=1, and Y=2 in FIG. 5 may hold output channel 504 and may have been written and stored in respective cycles 0 through 2.

For example, in a cycle 0, at least a first section of input 202 is stored, e.g., left aligned, into row Y=0. In the following cycle, cycle 1, the same section is stored into row Y=1, and so on, such that it takes three reading cycles to fill rows 506-510. Once rows 506-510 are populated, data from rows 506-510 can be combined to perform pooling calculations. For example, 3 values from each of row 506-510 may be combined to 9 values that generate pooling value 514 as a result.

It is noted that of pooling calculations may be performed in parallel. For example, to maintain a stream of incoming output channels 504, the number of pooling calculations may be equal to the total number of output channels in matrix processor 502, such that regardless of kernel size, pooling data corresponding to the entire width 518 of matrix processor 502 may be output.

In embodiments, the shift from one row to another corresponds to a shift of a pooling window when convolving across a matrix to generate pooling results. In embodiments, the shift that is attributable to the pooling window is defined by the number of cycles and may correspond to a stride having a value that is defined by the same number of cycles. In short, the stride dictates how often pooling data is output. For example, for a stride of 2, pooling values may be output every other cycle, thereby, skipping a row (or column) between outputs.

In embodiments, to create a sliding window of three rows of storage that slide one at a time, in a third cycle 512, the values of the first row 506 may be overwritten, such that the cycles use the set of three rows 506-510 and, based on pooling parameters, output a pooling calculation result.

It is understood that the number of rows of storage corresponds to the size of the kernel that is supported and that parameters such as window size, stride size, type of pooling used, etc., may be determined and controlled independent from the pooling process itself.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A pooling unit comprising one or more sub-circuits, wherein the pooling unit is configured to:
reformat input data into a plurality of rows to generate a pooling array, the input data being a linearized array, which includes a plurality of groups of neighborhood values, and a number of the rows corresponding to a size of a pooling kernel, wherein to reformat the pooling unit is configured to shift, over a number of arithmetic cycles, the rows relative to each other to reformat the input data, wherein the input data is received from a matrix processor and reflects an output channel of a convolutional layer, wherein the pooling array is reformatted in grid format such that one or more elements of an individual group are aligned in a horizontal direction and one or more elements of the individual group are aligned in a vertical direction, wherein the rows are shifted according to a shift of a pooling window corresponding to a stride having a value defined by the number of arithmetic cycles and dictating how often pooling values are output, wherein each row comprises a portion of the input data that correspond to an individual group of neighborhood values of the plurality of groups of neighborhood values, wherein individual pooling operations are applied to individual groups of neighborhood values; and apply in subsequent arithmetic cycles, according to the reformatted grid format, the individual pooling operations to the individual groups of neighborhood values to obtain a pooling output associated with the output channel, wherein the pooling unit is configured to output a pooling value every number of arithmetic cycles corresponding to the value of the stride.

2. The pooling unit according to claim 1, wherein the input data has been generated by the matrix processor.

3. The pooling unit according to claim 2, wherein, to maintain a stream of the input data, the pooling output is generated at a same rate as a rate at which the matrix processor generates the input data.

4. The pooling unit according to claim 2, wherein pooling calculations are performed in parallel, and wherein a number of pooling calculations equals a number of output channels in the matrix processor, such that the pooling output corresponds to a width of the matrix processor.

5. The pooling unit according to claim 1, wherein the pooling unit comprises a multiply-and-shift circuit configured to generate the pooling output based on the individual pooling operations.

6. The pooling unit according to claim 1, wherein the input data corresponds to a set of feature maps, and wherein the reformatted input data is used to reduce, by a predetermined factor, at least one of a height and a width of the set of feature maps.

7. The pooling unit according to claim 1, wherein the rows have a same width as the input data.

8. The pooling unit according to claim 1, wherein the pooling unit is configured to use a state machine to shift the pooling output into an output array.

9. The pooling unit according to claim 1, wherein the pooling unit is further configured to determine, without modifying a sequence of a pooling operation itself, a number and a location of data points involved in the pooling operation.

10. The pooling unit of claim 1, wherein the plurality of rows is filled with new input data reflecting a new output channel of the convolutional layer after the pooling output is generated.

11. A method for using a hardware-based pooling system, the method comprising:

receiving from a matrix processor a linearized array of data that represents an output channel of a convolution layer in a convolutional neural network (CNN), wherein the linearized array of data comprises a plurality of groups of neighborhood values, wherein the linearized array of data corresponds to a set of feature maps;

converting the linearized array of data into a set of rows in a grid format having a same width as the linearized array of data and such that one or more elements of an individual group are aligned in a horizontal direction and one or more rows of the individual group are aligned in a vertical direction, wherein the rows are shifted according to a shift of a pooling window corresponding to a stride having a value defined by a number of arithmetic cycles and dictating how often pooling values are output, wherein each row comprises portions of data that correspond to an individual group of neighborhood values of the plurality of groups of neighborhood values to which an individual pooling operation is to be applied, wherein a number of the rows corresponds to a size of a pooling kernel, wherein the set of rows are aligned according to a pooling operation that applies data to at least two rows of the set of rows to generate a pooling result according to the grid format; and outputting the pooling result into a memory device, wherein a pooling value is output every number of arithmetic cycles corresponding to the value of the stride.

12. The method according to claim 11, wherein the linearized array of data is received at a hardware-based pooling unit.

13. The method according to claim 11, wherein linearized arrays of data are received at intervals of the number of arithmetic cycles.

14. The method according to claim 11, wherein pooling results are generated at each interval.

15. The method according to claim 14, wherein the pooling results are output at each interval.

16. A method for using a pooling unit, the method comprising:

receiving, from a matrix processor at a hardware-based pooling engine, a set of data arrays that each have a predefined relationship with each other;

applying, according to a stride value, a pooling operation to data in at least two arrays from the set of data arrays to obtain a pooling result, wherein the hardware-based pooling engine is configured not to write a convolution result into memory, wherein the set of data arrays are converted into a plurality of rows, wherein the stride value determines a number of shifts between rows corresponding to a shift in a pooling window by defining a number of arithmetic cycles that comprise an interval in which a pooling value is output, wherein the stride value is defined by the number of arithmetic cycles and dictates how often the pooling result is output;

wherein the set of data arrays include portions of data that correspond to an individual group of neighborhood values of a plurality of groups of neighborhood values to which an individual pooling operation is to be applied, wherein the set of data arrays are in grid format such that one or more elements of the individual group of neighborhood values are aligned in a horizontal direction and one or more elements of the individual group of neighborhood values are aligned in a vertical direction, and wherein a number of the rows corresponds to a size of the pooling window; and outputting, according to the grid format, the pooling result as a row of data points which are associated with a layer of a convolutional neural network (CNN), wherein a pooling value is output every number of arithmetic cycles corresponding to the stride value.

17. The method according to claim 16, wherein obtaining the pooling result utilizes a one-to-one relationship between an output channel and an input channel.

18. The method according to claim 16, wherein the pooling result comprises one of an average pooling result and a max pooling result.

\* \* \* \* \*